United States Patent
Carson

(10) Patent No.: US 8,489,248 B2
(45) Date of Patent: Jul. 16, 2013

(54) PORTABLE BACKUP POWER SYSTEM

(76) Inventor: Nate Carson, Joliet, IL (US)

(*) Notice: Subject to any disclaimer, the term of this patent is extended or adjusted under 35 U.S.C. 154(b) by 327 days.

(21) Appl. No.: 12/816,747

(22) Filed: Jun. 16, 2010

(65) Prior Publication Data

US 2011/0313584 A1    Dec. 22, 2011

(51) Int. Cl.
*G06F 19/00* (2011.01)

(52) U.S. Cl.
USPC .......................................... 700/295; 363/142

(58) Field of Classification Search
USPC .................. 700/295; 363/142, 146; 320/110, 320/111, 112
See application file for complete search history.

(56) References Cited

U.S. PATENT DOCUMENTS

| | | | | |
|---|---|---|---|---|
| 5,237,258 A | * | 8/1993 | Crampton | 320/126 |
| 5,399,956 A | * | 3/1995 | DeLuca et al. | 323/222 |
| 5,689,412 A | * | 11/1997 | Chen | 363/125 |
| 5,783,927 A | * | 7/1998 | Chen | 320/110 |
| 5,835,366 A | * | 11/1998 | Pleso et al. | 363/59 |
| 6,527,721 B1 | * | 3/2003 | Wittrock et al. | 600/446 |
| 7,035,126 B1 | * | 4/2006 | Lanni | 363/142 |
| 7,471,000 B1 | | 12/2008 | Ruiz | |
| 2005/0039630 A1 | | 2/2005 | Kumar | |
| 2005/0055140 A1 | | 3/2005 | Brigham | |
| 2007/0252435 A1 | | 11/2007 | Coe | |
| 2009/0294150 A1 | | 12/2009 | McGinley | |

OTHER PUBLICATIONS

Patent Cooperation Treaty, Notification of Transmittal of the International Search Report and the Written Opinion of the International Searching Authority, in International application No. PCT/US11/40508, dated Nov. 17, 2011 (11 pages).
Notification Concerning Transmittal of International Preliminary Report on Patentability, International Preliminary Report on Patentability and Written Opinion of the International Searching Authority corresponding to International Application No. PCT/US2011/040508, Jan. 3, 2013, 7 pages.

* cited by examiner

*Primary Examiner* — Kidest Bahta
(74) *Attorney, Agent, or Firm* — McAndrews, Held & Malloy, Ltd.

(57) ABSTRACT

A portable power system for use with an electrical device. The system includes a portable power storage device, a motor, a controller, an alternator, an inverter, and a first monitor. The portable power storage device provides a DC voltage. The first monitor generates a first indication related to a characteristic of the portable power source. The controller monitors the primary power source delivering primary power to the electrical device, couples the portable power storage device to the inverter for generating an AC output, and selectively drives the motor in response to the first indication. The alternator is responsive to the motor for converting mechanical motion of the motor into an electrical signal for use to recharge the portable power storage device.

23 Claims, 4 Drawing Sheets

PORTABLE BACKUP POWER SYSTEM

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to power distribution, and more particularly, to power distribution from a portable generator to an appliance.

When electricity supplied from a primary source to electrical appliances is disconnected, known standby generators are typically used as secondary power sources to provide secondary or backup power. However, these standby generators typically use combustion-engines and fossil fuel to drive the engines. In such cases, the cost of using standby generators to provide power is high due to rising fuel cost. Standby generators are also limited to outdoor usage due to toxic fume emission. In order to utilize these outdoor standby generators to provide power to mostly indoor appliances, numerous costly devices and interfaces between the standby generators and the indoor appliances are also required.

BRIEF SUMMARY OF THE INVENTION

Certain embodiments of the present invention provide backup power systems, and methods for providing backup power.

In one embodiment, the invention provides a portable power system for providing secondary power to an electrical device upon disconnection of a primary power source from delivering primary power to the electrical device. The system includes a portable power storage device, a motor, an alternator, an inverter, a first monitor and a controller. The portable power storage device provides a DC voltage. The motor is selectively driveable by the portable power storage device. The alternator is responsive to motor for converting mechanical motion of the motor into an electrical signal for use to recharge the portable power storage device. The inverter receives a DC voltage and generates an AC output for use to provide the secondary power to the electrical device. The first monitor generates a first indication related to a characteristic of the portable power source. The controller monitors the primary power source delivering primary power to the electrical device, couples the portable power storage device to the inverter for generating the AC output, and selectively drives the motor in response to the first indication.

In another embodiment, the invention provides a method for supplying secondary power to an electrical device upon disconnection of a primary power source from delivering primary power to the electrical device. The method includes monitoring the primary power source delivery primary power to the electrical device, coupling a portable power storage device to an inverter for generating an AC output for use to provide the secondary power to the electrical device, and monitoring a first indication related to a characteristic of the portable power storage device. The method also includes selectively driving the motor with the portable power storage device in response to the first indication, and converting mechanical motion of the motor into an electrical signal for use to recharge the portable power storage device.

In yet another embodiment, the invention provides a secondary power system integrated with an electrical device upon disconnection of a primary power source from delivering primary power to the electrical device through a device controller of the electrical device. The secondary power system includes a portable power storage device, a motor, a first sensing device, a control board, an alternator, and an inverter. The motor is selectively coupled to the portable power storage device. The first sensing device generates a first indication related to a characteristic of the secondary power system. The control board communicates with the device controller, selectively couples the portable power storage device to the motor in response to the primary power being disconnected from the primary source and thereby drives the motor in response to the first indication. The alternator is mechanically coupled to the motor and being driven by the motor. The alternator generates a direct-current signal. The inverter inverts the direct-current signal into an alternating-current signal and thereby provides the secondary power.

Figure 1:
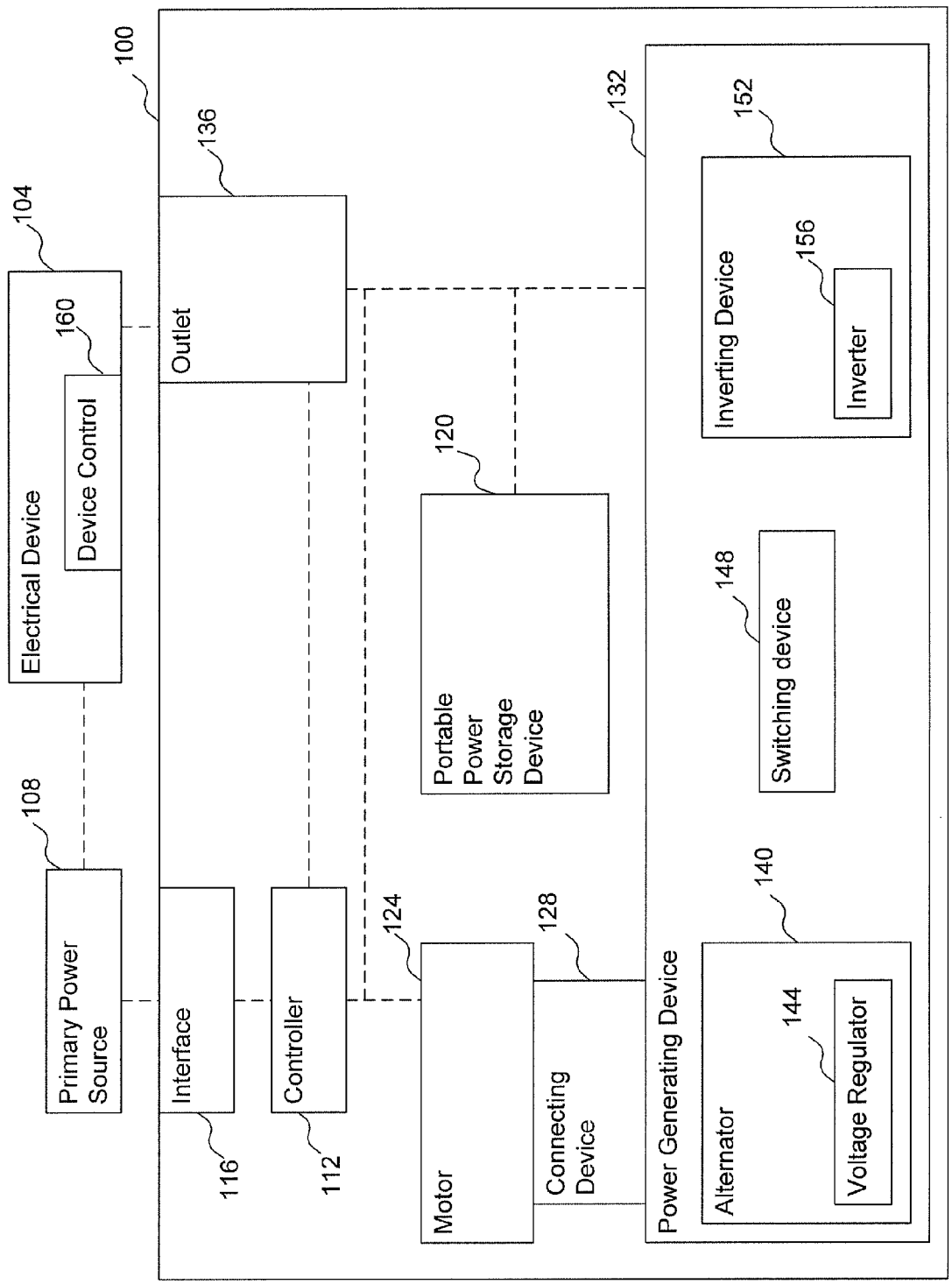
FIG. 1 is a block diagram of a portable power system according an embodiment of the invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

As should also be apparent to one of ordinary skill in the art, the systems shown in the figures are models of what actual systems might be like. Some of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the drawings. However, no specific meaning is implied or should be inferred simply due to the use of capitalization.

Embodiments of the invention relate to a system for providing power to a connected appliance or device. The system includes a controller circuit that monitors power delivered to the device. The controller circuit connects a portable power storage device to the device, and to a motor thereby energizing the motor. In turn, the motor drives a power generating device to supply power to charge the portable power storage device.

Referring to FIG. 1, a portable power system 100 is connected to an electrical device 104 and to a primary power source 108. Under normal operation, the primary power source 108 supplies power to operate the device 104. Upon disconnection of the primary power source 108 from the device 104, the system 100 supplies a secondary or backup power to the device 104. Of course, the system 100 can also be used as a stand-alone power generator to supply primary power to the device 104. Exemplary devices 104 include, but are not limited to, heating, ventilating, and air conditioning ("HVAC") equipment, boilers, inflatable structures, recreational vehicle ("RV") accessories, breathing apparatuses, construction appliances, electric vehicles, medical equipment, refrigeration systems, and the like.

The portable power system 100 includes a control board or controller 112 that controls and monitors operations of the portable power system 100, as detailed hereinafter. In some embodiments, the controller 112 includes primary and secondary controllers (not shown in FIG. 1), where the secondary controller is a redundant controller. The primary and secondary controllers are typically daisy-chained together, but other types of connections can also be used. In the event of a power outage or other issues associated with the primary controller, the secondary controller becomes a backup and will be activated to perform similar functions, until the primary controller is powered again.

The controller 112 is coupled to an interface 116 that allows interaction between a user and the portable power system 100. In some embodiments, the interface 116 includes a power switch (not shown) for turning on the portable power system 100, operational indicators (not shown), such as, for example, LEDs and a multi-meter for displaying operational information and statuses to the user, switches (not shown) allowing the user to diagnose system issues, switches/controls (not shown) allowing the user to troubleshoot the portable power system 100, and communication ports (not shown), such as, for example, universal serial bus ("USB") receptacles for receiving a USB plug such that operational information and/or diagnosis of the portable power system 100 can be downloaded or uploaded, as detailed hereinafter. In some embodiments, the operation information is stored in a memory (not shown) on the controller 112. Exemplary memory includes, but is not limited to, a removable hard disk drive, a read only memory ("ROM"), a random access memory ("RAM"), a flash memory, and the like. In some embodiments, the controller 112 and the interface 116 are integrated as a single unit. In the embodiments in which the portable power system 100 provides the primary power to the device 104, instead of the primary power source 108, such as in an RV environment, the portable power system 100 also uses the interface 116 as a control interface for the user.

The portable power system 100 also includes a portable power storage device 120, a motor 124, a connecting device 128, and a power generating device 132. The portable power storage device 120 is a 12 VDC battery that produces a direct-current ("DC") signal. An exemplary portable power storage device 120 is an Optima battery made by Johnson Controls, which produces a 780 A cranking current signal. In other embodiments, the portable power storage device 120 can be an alternating-current ("AC") battery, which produces an AC signal output. It should be noted other battery sizes and capacities can be used depending on the particular applications.

The motor 124 is connected to the connecting device 128 which conveys the spinning motion and energy of the motor 124 to the power generating device 132. In some embodiments, the motor 124 is a ⅓ horsepower and thermally protected motor having a minimum speed of 1725 RPM and a continuous duty of about 6.2 A, running on a 110 VAC circuit. Exemplary connecting devices 128 include, but are not limited to, pulleys, belts, gears, and the like. The power generating device 132 converts or translates the conveyed motion and energy of the motor 124 into electricity. The power generating device 132 includes an alternator 140, a switching device 148, and an inverting device 152. Power is supplied to the inverting device 152 via the alternator 140 or via the portable power storage device 120. The switching device 148 controllably connects the alternator 140 and/or the portable power storage device 120 to the inverting device 152.

The power generating device 132 supplies the electricity to the device 104 via a socket or outlet 136 located on a panel of the portable power system 100. Although the outlet 136 is described as located on the panel of the portable power system 100, the outlet 136 can alternately be an electrical cord extending from the portable power system 100 directly into the electrical device 104, or an electrical cord having an outlet to receive an electrical plug of the device 104. Although the portable power system 100 is described as supplying a 110 VAC signal, the portable power system 100 can also be configured to supply a 220 VAC signal, or a combination of 110 VAC and 220 VAC signals.

The alternator 140 is generally sized and specified according to the particular application. Generally, alternators having higher amperages will be used for applications demanding more power. In some embodiments, the alternator 140 is a standard 2-wire Delco 105 Amp alternator. Under normal operating conditions, the Delco 105 Amp alternator supplies 60-70 Amps. However, when the device 104 is required to consume more energy than a Delco 105 Amp alternator can provide, other alternators can also be used. In such an event, an alternator having a capacity of, such as, for example, 200 A can be installed in place of the Delco 105 alternator.

When the alternator 140 receives the conveyed motion from the motor 124, the alternator 140 translates the spinning motion into electricity. The electricity is regulated by the voltage regulator 144. In the embodiment as shown in FIG. 1, the alternator 140 has an integrated voltage regulator 144. In other embodiments, the voltage regulator 144 can be a separate component connected to the alternator 140.

The output of the voltage regulator 144 is connected to the portable power storage device 120 via switching device 148. When the output voltage of the portable power storage device 120 drops below a predetermined voltage threshold, such as, for example, 11.5V, as monitored by the controller 112, the controller 112 activates the switching device 148 to provide the voltage regulated output of the voltage regulator 144 to the portable power storage device 120, to recharge the portable power storage device 120. When the output voltage of the portable power storage device 120, as monitored by the controller 112, is above another predetermined voltage threshold, such as, for example, 13V, the controller 112 activates the switching device 148 to disconnect the voltage regulator 144 from the portable power storage device 120. In addition, the output of voltage regulator 144 is provided to the inverting device 152 so as to produce an AC current output.

The inverting device 152 includes one or more inverters 156 depending on the particular application. For example, low amperage inverters will be used for applications that require only low amperage output. For another example, both high and low amperage inverters will be used for applications that require both low and high amperage outputs. For another example, where the device 104 is a boiler, or any device requiring less than about 18 A, inverters 156 running at about 2K Watts can be used. Existing forced air furnaces may require inverters of about 3K Watts. Field work such as construction work sites may require inverters of about 5K Watts, or an inverter combination of 2K and 3K Watts. In addition, 220 VAC inverters can be used for applications such as central air units.

In some embodiments, the output of the inverting device 152 is surge protected. The inverted output from the inverter 156 is directly supplied to the outlet 136. In one embodiment, the inverter 156 is a PEAK 2000 W inverter from Old World Industries, rated at 25 A, and having an 11-14.5 VDC input and generating a 120 VAC output. In some embodiments, the inverter 156 provides no less than about 16.6 A with a surge capacity of about 33.2 A.

The switching device 148 receives control signals from the controller 112 in order to (1) control the timing of recharging the portable power storage device 120, and (2) control the timing of output of electrical power via the outlets 136. The switching device 148 connects and/or disconnects the portable power storage device 120 to or from the power generating device 132, and connects and/or disconnects the outlet 136 to or from the power generating device 132.

In some embodiments, the alternator 140 may take a transient time to generate an amount of electricity that can be inverted by the inverting device 152. The controller 112 determines (1) whether the motor 124 is spinning at a frequency or speed that is higher than a predetermined frequency or speed threshold, or (2) whether the alternator 140 through the voltage regulator 144 is generating an amount of electricity that is above a predetermined electricity threshold, or (3) whether the output voltage of the portable power storage device 120 is within an operational range, such as, for example, 11.5V and 13V, or (4) whether the inverting device 152 is generating an output that is above another predetermined electrical threshold. Exemplary electrical thresholds include, but are not limited to, wattage thresholds, amperage thresholds, and voltage thresholds. In some embodiments, a voltage threshold of 120 VAC is monitored at the outputs of the inverting device 152. When the monitored inverted output at the inverting device 152 drops below 120 VAC, the controller 112 disconnects the inverting device 152 from the outlet 136. Similarly, in other embodiments, when portable power storage device 120 generates an output of less than 11.5 VDC, the controller 112 also turns off the inverting device 152.

In some embodiments, the portable power system 100 includes one or more frequency or speed sensors (not shown) that monitor the spinning frequency or the speed of the motor 124, or sensor that monitor the movement of the connecting device 128, and/or monitor the output of the alternator 140. If the frequency or speed sensors indicate that the motor 124, for example, is spinning at a particular speed, and if the controller 112, upon receiving the particular speed, determines that the particular speed is above the predetermined speed threshold, the controller 112 via the switching device 148 disconnects the portable power storage device 120 from the voltage regulator 144, stopping the portable power storage device 120 from being overcharged. This can enhance or maximize the life of the portable power storage device 120. However, if the controller 112 determines that the particular speed is of the motor 124 below a predetermined speed threshold, the controller 112 via the switching device 148 continues to connect the output of the voltage regulator 144 to the portable power storage device 120, and, thus recharges the portable power storage device 120. Similarly, for example, if the controller 112 determines that the outputs of the alternator 140 are above a predetermined voltage threshold, the controller 112 via the switching device 148 closes a switch (not shown) that allows the alternator 140 to recharge the portable power storage device 120.

For another example, if the controller 112 determines that outputs of the alternator 140 are above another predetermined voltage threshold, the controller 112 via the switching device 148 closes another switch (not shown) that allows the alternator 140 to provide the DC signals to the inverting device 152, and thereby provide the backup power at the outlet 136. In addition, the controller 112 via the switching device 148 closes another switch (not shown) that allows the portable power storage device 120 to provide DC signals to the inverting device 152, and thereby provide backup power at the outlet 136. Other functions of the controller 112 via the switching device 148 include manual operations of the portable power system 100, and overriding operations of the inverting device 152 when an anomaly has been detected, or when the inverting device 152 requires a reset.

In some embodiments, the portable power system 100 can be integrated with the electrical device 104, such as, for example, a furnace unit. In such cases, wirings of a device control 160 of the electrical device 104 are rewired to the controller 112. When the primary power source 108 is disconnected from the electrical device 104, the device control 160 communicates that event to the controller 112. In turn, the controller 112 signals the switching device 148, which connects the portable power storage device 120 to the motor 124 and to the power generating device 132 for generating electricity at the outlets 136. Details of the operation are described hereinafter.

It should be noted that the portable power system 100 also includes other components not shown, such as, for example, temperature sensors placed therein to monitor temperatures of different components and of the portable power system 100. In some embodiments, the monitored temperatures are recorded on the controller 112. The portable power system 100 also includes venting grills to manage air flow in and out of the portable power system 100, internal fans also to control air flow in and out of the portable power system 100, and one or more slow-blow fuses placed between the alternator 140 and the inverting device 152 to prevent overloading or arching.

Figure 2:
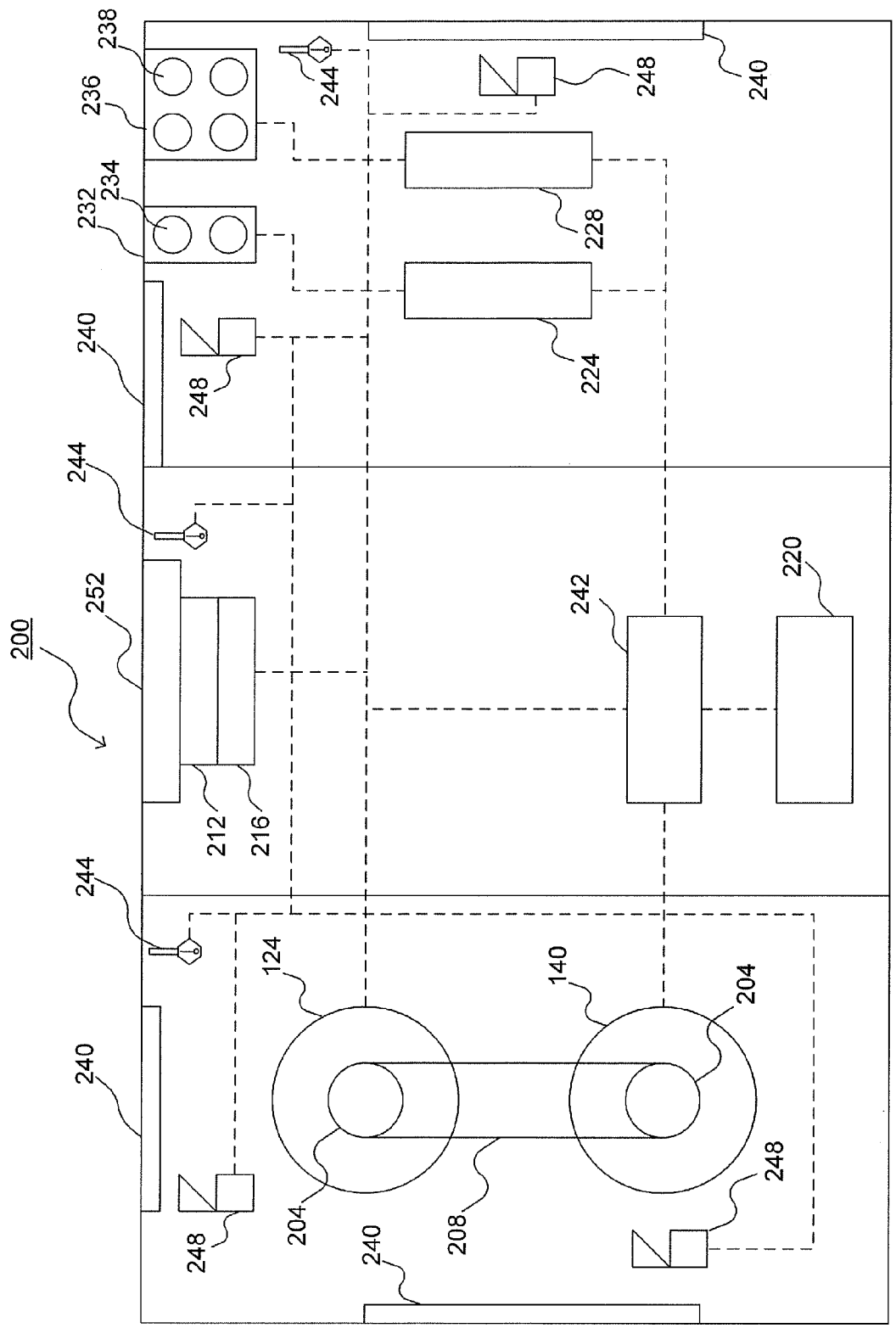
FIG. 2 is a first exemplary schematic of the portable power system as shown in FIG. 1.

FIG. 2 illustrates an exemplary system 200 of the portable power system 100 of FIG. 1, wherein like numerals refer to like parts. The system 200 includes a motor 124 connected to an alternator 140 through a set of pulleys 204 and one or more belts 208. In the embodiment shown, the controller 112 includes a primary control board 212 and a secondary control board 216. In some embodiments, the secondary control board 216 is a redundant board that duplicates functions of the primary control board 212. The portable power storage device 120 (FIG. 1) is a battery 220, and the inverting device 152 (FIG. 1) includes two inverters 224, 228. The outlet 136 (FIG. 1) includes two subsets of outlets 232, 236. The outlet 232 further includes two low amperage purge protected outlets 234 connected to the inverter 224, whereas the outlet 236 includes four high amperage protected outlets 238 connected to the inverter 228.

In some cases, devices connected to the high amperage protected outlets 238 demand more power, such that a certain amount of electrical current from the portable power storage device 220 is needed to drive the inverter 228. In other cases, a certain amount of time is needed for the alternator 140 to reach a predetermined speed threshold prior to power can be drawn at the high amperage protected outlets 238. A switch 242 is thus connected between the battery 220 and the inverter 228, and provides a time delay at startups to build up the amount of current for the inverter 228, or to allow the alternator 140 to reach the predetermined speed threshold.

Venting grills 240 are placed throughout the system 200 to control air flow in and out of the system 200. The system 200 also includes sensors 244 which are placed throughout the system 200 to detect over heating. In some embodiments, the sensors 244 send temperature coded signals to the controllers 212, 216 such that the system 200 can be shut down in the event the interior temperature of the system 200 reaches a predetermined temperature threshold, and/or to turn on a plurality of cooling fans 248 to actively control the interior temperature. An interface 252 includes a USB port and a plurality of LEDs.

Figure 3:
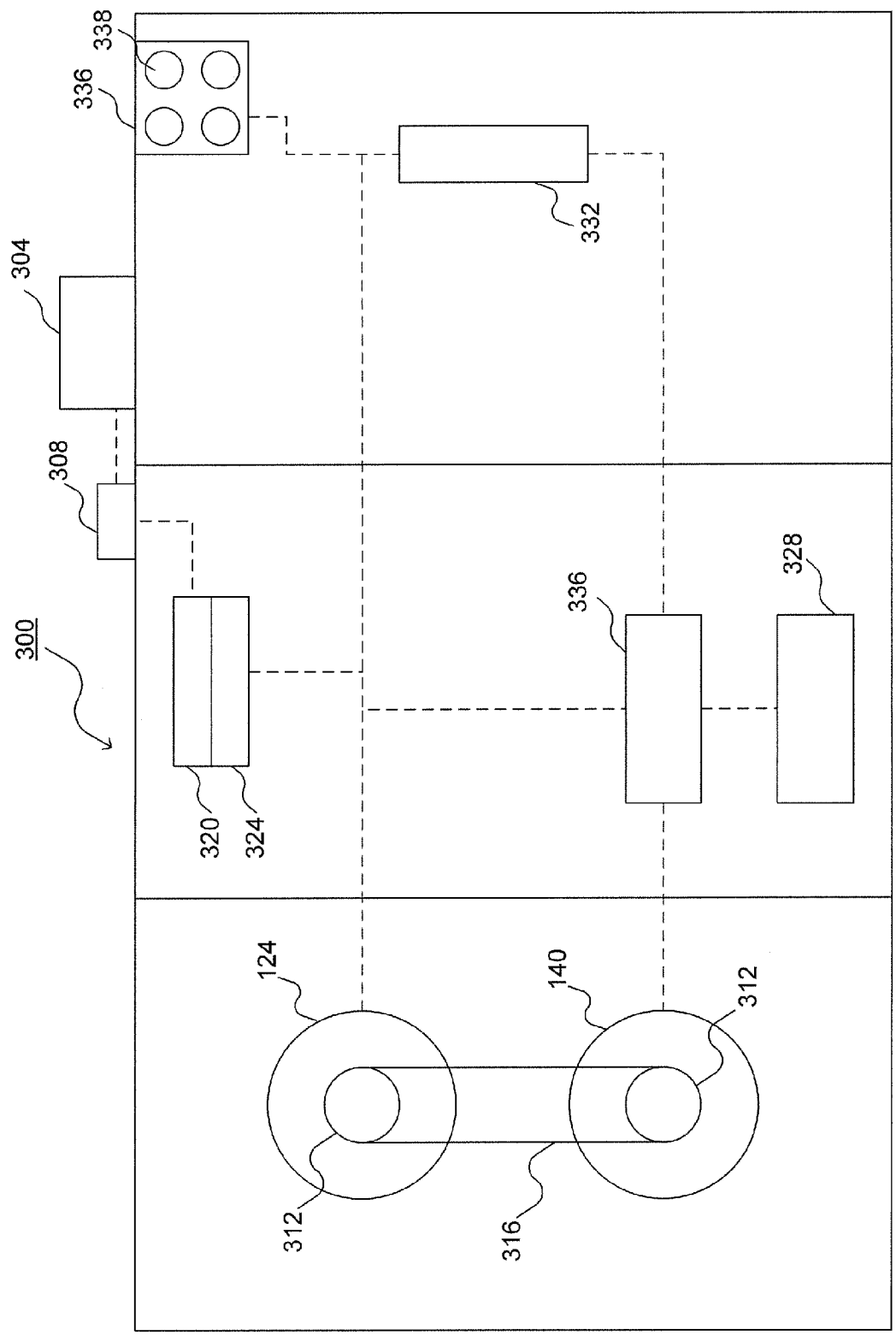
FIG. 3 is a second exemplary schematic of the portable power system integrated with a furnace as shown in FIG. 1.

Similarly, FIG. 3 illustrates another system 300 of the portable power system 100 of FIG. 1, wherein like numerals refer to like parts. The system 300 is integrated with a furnace 304 having a furnace control 308 (device control 160 of FIG. 1). The system 300 includes a motor 124 connected to an alternator 140 through a set of pulleys 312 and belts 316. In the embodiment shown, the controller 112 (FIG. 1) includes a primary control board 320 and a secondary control board 324. The portable power storage device 120 (FIG. 1) is a battery 328, and the inverting device 152 (FIG. 1) includes one inverter 332. The outlet 136 (FIG. 1) includes an outlet 336. The outlet 336 further includes four high amperage protected outlets 338 connected to the inverter 332. A switch 336 is connected between the battery 328 and the inverter 332. The switch 336 provides a time delay at startups, as discussed above, for example, so as to allow the motor 124 to reach a predetermined speed or frequency before connection of battery 328 to the inverter 332.

Figure 4:
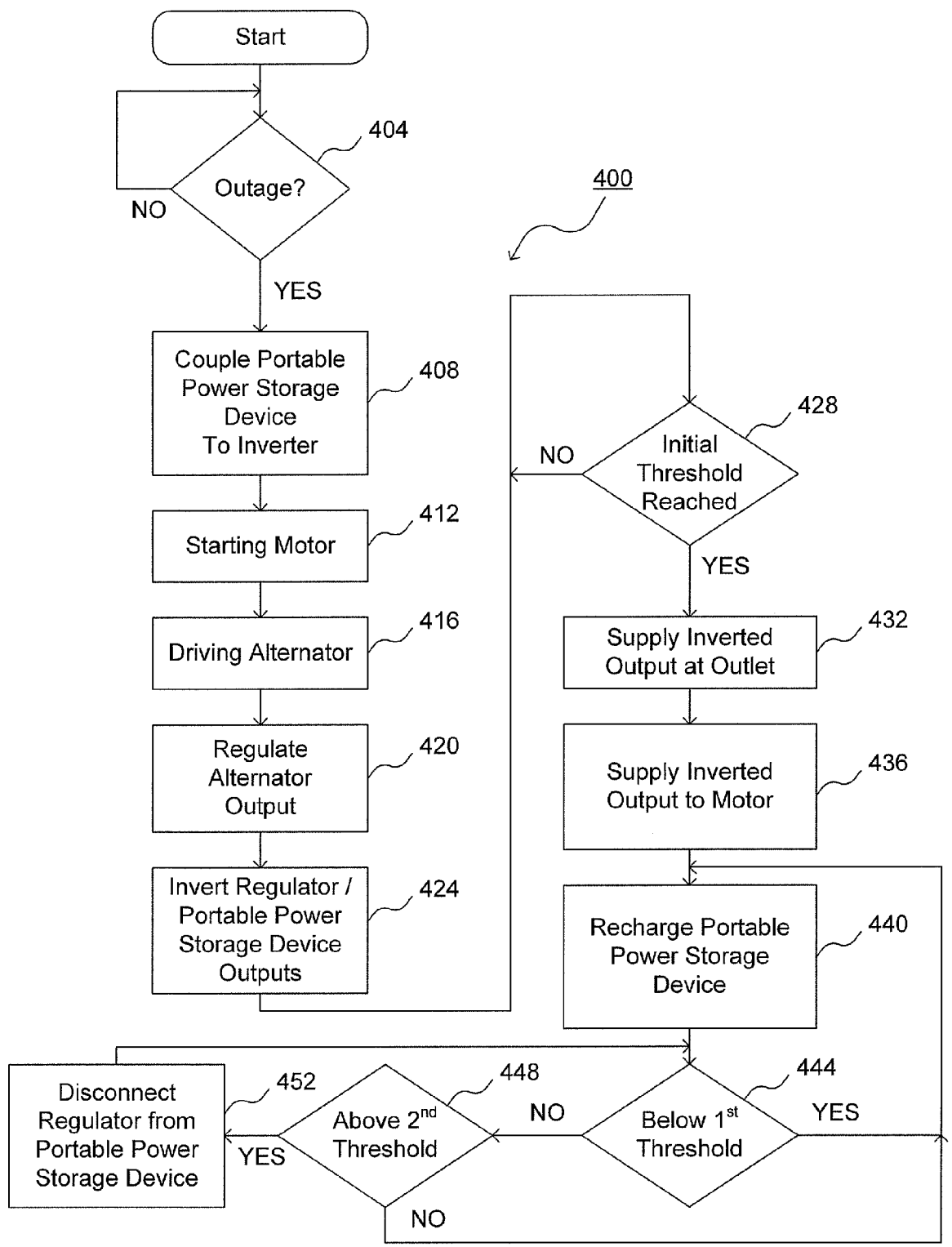
FIG. 4 is an operation flow chart of the portable power system of FIG. 1 used in accordance with embodiments of the present invention.

FIG. 4 illustrates an operational flow chart 400 of the portable power system 100 of FIG. 1. At step 404, the controller 112 detects whether a power outage has occurred by monitoring signal coming from the primary source 108 via the interface 116. If the controller 112 determines that a power outage has occurred, the controller 112 instructs the switching device 148 to couple the portable power storage device 120 to the inverting device 152, at step 408. This in turn provides output power at the outlet 136 and to the motor 124.

Upon connection of the portable storage device 120 to the inverting device 152, the motor 124 is started, at step 412. The controller 112 may also control any switch between the inverting device 152 and the motor 124. The motor 124 in turn drives the alternator 140, at step 416. Outputs of the alternator 140 are regulated by the voltage regulator 144, at step 420.

The regulated alternator outputs are typically DC signals. The output of the regulator 144 charges the portable power storage device 120 with the regulated outputs, as described above. Additionally, both the regulated outputs and the outputs from the portable power storage device 120 are sent to the inverting device 152 and are inverted to AC signals, at step 424. Alternatively, either only the regulated outputs or only the outputs from the portable power storage device 120 are sent to the inverting device 152 and are inverted to AC signals.

In some embodiments, the transmission of the inverted output signal to the outlet 136 may be switched or delayed. The controller 112 via sensors at the motor 124, or at the voltage regulator 144, determines whether the motor 124 is spinning at a predetermined speed threshold. In other embodiments, at step 428, the controller 112 determines if a predetermined amount of time delay has elapsed. If such an initial threshold has been met as determined, at step 428, the controller 112 via the switching device 148 supplies the AC signals to the outlet 136, at step 432. At step 436, the controller 112 may at this time (instead of step 412) also supply the inverted output to the motor 124 via the switching device 148. In addition, the controller 112 may control recharging of the portable power storage device 120 with the regulated outputs from the voltage regulator 144, as described above, at step 440.

The controller 112 continues to monitor additional thresholds, such as, for example, electrical thresholds, and speed or frequency thresholds, at steps 444 and 448. As discussed above, exemplary electrical thresholds include, but are not limited to, wattage thresholds, amperage thresholds, and voltage thresholds. Exemplary frequency thresholds include motor speed thresholds, and alternator speed thresholds.

In some embodiments, the first and optional second thresholds at steps 444 and 448 form an operational output voltage range of the portable power storage device 120. For example, the first threshold represents the output voltage of the portable power storage device and is 11.5V, and the second threshold represents the output voltage of the portable power storage device, and is 13V. As such, the portable power storage device 120 has an operational output voltage range between 11.5V and 13V. In such a case, if the controller 112 determines that the output voltage is below the first threshold, the controller 112 controls the recharging of the portable power storage device 120. Otherwise, if the controller 112 determines that the output voltage is not below the first threshold, the controller 112 proceeds to determine if the output voltage is above the optional second threshold, at step 448.

If the controller 112 determines the output voltage is below the second threshold at step 448, the controller 112 controls the recharging of the portable power storage device 120. If the controller 112 determines the output voltage is above the second threshold at step 448, the controller 112 proceeds to disconnect the output of the voltage regulator 144 from the portable power storage device 120, thereby stopping the portable power storage device 120 from being over-charged at step 452, and to repeat step 404.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A portable power system for providing secondary power to an electrical device upon disconnection of a primary power source from delivering primary power to the electrical device, the system comprising:
 a portable power storage device for providing a DC voltage;
 an electrical motor selectively driveable by said portable power storage device;
 an alternator responsive to said motor for converting mechanical motion of said motor into an electrical signal for use to recharge said portable power storage device;

an inverter for receiving a DC voltage and generating an AC output for use to provide the secondary power to the electrical device;

a timer for generating a timed indication of lapse of a predetermined time period;

a first monitor for generating a first indication and a second indication related to a characteristic of said portable power storage device; and a controller configured to 1) monitor the primary power source delivering primary power to the electrical device, 2) couple said portable power storage device to said inverter for generating said AC output, 3) connect said alternator to said inverter in order to generate said AC output in response to said timed indication, 4) selectively drive said motor in response to said first indication indicating that said characteristic is below a first threshold in order to connect said electrical signal to recharge said portable power storage device, and 5) disconnect said electrical signal from recharging said portable power storage device in response to said second indication indicating that said characteristic is above a second threshold while providing said secondary power to said electrical device.

2. The portable power system of claim 1 and wherein said controller disconnects said portable power storage device from said motor in response to said second indication that the secondary power is above a threshold.

3. The portable power system of claim 1, wherein said motor drives said alternator at a frequency, and wherein said monitor monitors said frequency for generating said first indication.

4. The portable power system of claim 1, wherein said inverter supplies said AC output to said motor.

5. The portable power system of claim 1, wherein said electrical signal developed by said alternator is transmitted to said portable power storage device.

6. The portable power system of claim 1 and further comprising a pulley system connecting said motor to said alternator.

7. The portable power system of claim 1 and further comprising a voltage regulator connected to said alternator for regulating the output of said alternator into said electrical signal.

8. The portable power system of claim 1, wherein said portable power storage device comprises a direct-current battery.

9. A method of supplying secondary power to an electrical device upon disconnection of a primary power source from delivering primary power to said electrical device, the method comprising:

monitoring the primary power source delivery primary power to the electrical device;

generating a timed indication in response to 1) a predetermined time lapse and 2) a disconnection of said primary power source from said electrical device;

coupling a portable power storage device to an inverter for generating an AC output for use to provide the secondary power to the electrical device in response to said timed indication, thus connecting said secondary power to said electrical device;

monitoring a first indication and a second indication related to a characteristic of said portable power storage device;

selectively driving an electrical motor with said portable power storage device in response to said first indication indicating that said characteristic is below a first threshold in order to connect said electrical signal to recharge said portable power storage device;

converting mechanical motion of said motor into an electrical signal for use to recharge said portable power storage device; and disconnecting said electrical signal from recharging said portable power storage device in response to said second indication indicating that said characteristic is above a second threshold while providing said secondary power to said electrical device.

10. The method of claim 9, further comprising:
disconnecting said portable power storage device from said motor in response to said second indication that the secondary power is above a threshold.

11. The method of claim 9, wherein said motor spins at a frequency, the method further comprising monitoring said frequency for generating said first indication.

12. The method of claim 9, further comprising supplying said AC output to said motor.

13. The method of claim 9, further comprising recharging said portable power storage device with said electrical signal.

14. The method of claim 9, wherein said portable power storage device comprises a direct-current battery.

15. The method of claim 9, further comprising regulating said electrical signal.

16. A secondary power system integrated with an electrical device upon disconnection of a primary power source from delivering primary power to said electrical device through a device controller of said electrical device, the secondary power system comprising:

a portable power storage device;

an electrical motor selectively coupleable to said portable power storage device;

a timer for generating a timed indication of lapse of a predetermined time period;

a first sensing device generating a first indication and a second indication related to a characteristic of said secondary power system;

a control board communicating with said device controller, selectively coupling said portable power storage device to said motor in response to said primary power being disconnected from said primary source in response to the generation of said timed indication, and thereby driving said motor in response to said first indication indicating that said characteristic is below a first threshold in order to connect said electrical signal to recharge said portable power storage device, and disconnecting said electrical signal from recharging said portable power storage device in response to said second indication indicating that said characteristic is above a second threshold while providing said secondary power to said electrical device;

an alternator mechanically coupled to said motor and being driven by said motor, said alternator generating a direct-current signal; and an inverter inverting said direct-current signal into an alternating-current signal and thereby providing the secondary power.

17. The secondary power system of claim 16, and wherein said control board disconnects said portable power storage device from said motor in response to said second indication that the secondary power is above a threshold.

18. The secondary power system of claim 16, wherein said motor drives said alternator at a frequency, and wherein said first sensing device monitors said frequency for generating said first indication.

19. The secondary power system of claim 16, wherein said inverter supplies said alternating-current signal to said motor.

20. The secondary power system of claim 16, wherein said alternator recharges said portable power storage device.

21. The secondary power system of claim 16, further comprising at least one of a pulley system and a gear system connecting said motor to said alternator.

22. The secondary power system of claim 16, wherein said portable power storage device comprises a direct-current battery.

23. The secondary power system of claim 16, wherein said alternator comprises a voltage regulator regulating said backup power being supplied.

* * * * *